United States Patent
Lalka et al.

(10) Patent No.: US 10,051,415 B1
(45) Date of Patent: Aug. 14, 2018

(54) CONTEXTUAL GEO-LOCATION IDLING

(71) Applicant: The Toronto-Dominion Bank, Toronto (CA)

(72) Inventors: Vipul Kishore Lalka, Oakville (CA); Edward Robert Lucas Lounsbury, Toronto (CA); Arun Victor Jagga, Toronto (CA); John Jong-Suk Lee, Toronto (CA); Sarabjit Singh Walia, Demarest, NJ (US)

(73) Assignee: The Toronto-Dominion Bank, Toronto (CA)

( * ) Notice: Subject to any disclaimer, the term of this patent is extended or adjusted under 35 U.S.C. 154(b) by 0 days.

(21) Appl. No.: 15/724,489

(22) Filed: Oct. 4, 2017

(51) Int. Cl.
 *H04M 3/493* (2006.01)
 *H04W 4/02* (2018.01)
 *H04L 12/26* (2006.01)

(52) U.S. Cl.
 CPC .............. *H04W 4/02* (2013.01); *H04L 43/10* (2013.01)

(58) Field of Classification Search
 CPC ....................................................... H04W 4/02
 USPC ............ 455/414.2, 410, 456.1, 456.2, 456.5
 See application file for complete search history.

(56) References Cited

U.S. PATENT DOCUMENTS

| | | | |
|---|---|---|---|
| 8,228,234 B2 | 7/2012 | Paulson et al. |
| 8,744,534 B2 | 6/2014 | Wang et al. |
| 9,498,163 B2 | 11/2016 | Frieder et al. |
| 9,510,204 B2 | 11/2016 | Haro et al. |
| 2013/0085861 A1 | 4/2013 | Dunlap |
| 2015/0066691 A1 | 3/2015 | Ready et al. |
| 2015/0227934 A1 | 8/2015 | Chauhan |
| 2015/0304437 A1 | 10/2015 | Vaccari et al. |
| 2016/0171499 A1 | 6/2016 | Meredith et al. |
| 2016/0189131 A1 | 6/2016 | Williams |
| 2016/0223682 A1 | 8/2016 | Pozo et al. |
| 2016/0379141 A1 | 12/2016 | Judge et al. |
| 2017/0004499 A1 | 1/2017 | Dickinson et al. |
| 2017/0006434 A1 | 1/2017 | Howe et al. |
| 2017/0011382 A1 | 1/2017 | Zoldi et al. |
| 2017/0041759 A1 | 2/2017 | Gantert et al. |

OTHER PUBLICATIONS

Lane, "How to Implement Geolocation Without Draining your User's Battery," https://blog.metova.com/geolocation-without-draining-battery/, Dec. 12, 2014, 14 pages.

*Primary Examiner* — Joel Ajayi
(74) *Attorney, Agent, or Firm* — Fish & Richardson P.C.

(57) ABSTRACT

The present disclosure involves systems, software, and computer implemented methods for augmenting ping timing for mobile devices based on contextual analysis of a current data exchange based on historical data exchange data. One example system includes operations such as receiving information related to a current data exchange associated with a particular user profile. The current data exchange can be associated with a particular location, and each user profile can be associated with at least one data exchange pattern, where the data exchange pattern identifies a locational and a data exchange history of the user profile. The current data exchange is compared to a data exchange pattern of the particular user profile. If the current data exchange does not correspond, a request for the user's current location is transmitted to an associated user device. If the current data exchange does correspond, the current data exchange is associated with the particular location.

20 Claims, 6 Drawing Sheets

US 10,051,415 B1

CONTEXTUAL GEO-LOCATION IDLING

TECHNICAL FIELD

The present disclosure relates to computer-implemented methods, software, and systems for augmenting ping timing for mobile devices based on contextual analysis of a current data exchange information based on historical data exchange data.

BACKGROUND

Location-based services can be used to enhance mobile applications. For example, information presented by an application or processing performed by an application can be based on or influenced by the location of a mobile device. As a specific example, advertising presented in an application can be based on a mobile device's location. For example, an advertisement for an establishment can be presented in an application in response to a detection that the mobile device is within a threshold radius of the establishment.

To determine the location of a particular device, a backend server or mobile application may trigger a request for the current location of the particular device. The request may be in response to a standard location tracking or location association operation, or in response to an event.

SUMMARY

The present disclosure involves systems, software, and computer implemented methods for augmenting ping timing for mobile devices based on contextual analysis of a current data exchange information based on historical data exchange data. One example system includes a communications module, at least one memory, and at least one hardware processor interoperably coupled with the at least one memory and the communications module. The at least one memory can store instructions, a plurality of user profiles, and a repository of data exchange patterns associated with particular user profiles of the plurality of user profiles. Each user profile can be associated with at least one user device, and each data exchange pattern can identify a locational and a data exchange history of the particular user profile. The instructions can instruct the at least one hardware processor to perform various operations, including receiving a first signal, via the communications module, associated with information related to a current data exchange associated with a particular user profile, where the current data exchange is associated with a particular location. The current data exchange associated with the particular user profile can be compared with the data exchange pattern associated with the particular user profile to determine whether the current data exchange corresponds to the data exchange pattern associated with the particular user profile. In response to determining that the current data exchange does not correspond to the data exchange pattern associated with the particular user profile, a second signal including a request for information on a current location of the user profile can be transmitted, via the communications module, to a particular user device associated with the particular user profile. A third signal from the user device can be recevied, via the communications module, from the user device in response to the second signal and can include a current location of the user device. That location received from the user device can then be associated with the current data exchange. Alternatively, in response to determining that the current data exchange does correspond to the data exchange pattern associated with the particular user profile, the current data exchange can be associated with the particular location associated with and included in the first signal.

Implementations can optionally include one or more of the following features.

In some instances, the data exchange comprises a financial transaction, and the data exchange pattern identifies a history of financial transactions and locations associated with each of the financial transactions.

In some instances, associating the current data exchange with the particular location associated with the first signal in response to determining that the current data exchange corresponds to the transactional pattern associated with the particular user profile further can comprise or include suppressing transmission of the second signal by the communications module.

In some instances, the information related to the current data exchange identifies a particular entity associated with the current data exchange, where the particular entity is associated with a physical location.

In some instances, the pattern for the particular user profile identifies a data exchange and location pattern determined based on a collected history of prior data exchanges associated with the user profile. In those instances, at least a portion of the prior data exchanges in the collected history for particular user profiles are associated with a location obtained by a location provided by the user device at a time the prior data exchange occurred. Alternatively in some of those instances, at least a portion of the prior data exchanges in the collected history for particular user profiles are associated with a location obtained from information associated with the data exchange provided by an entity with which the data exchange was executed.

In another of those instances, at least some of the data exchange and location patterns are associated with time ranges, where the time ranges identifying when particular portions of the patterns are valid. In those instances, the current data exchange is associated with a current time, and comparing the current data exchange associated with the particular user profile with the pattern of the particular user profile to determine whether the current data exchange corresponds to the pattern includes applying the pattern associated with a time range including the current time for the comparison.

In some instances, comparing the current data exchange associated with the particular user profile with the pattern of the particular user profile to determine whether the current data exchange corresponds to the data exchange pattern can include generating a confidence score based on the comparison, where the current data exchange is determined to correspond to the data exchange pattern based on the generated confidence score meeting or exceeding a threshold confidence score.

In some instances, in response to determining that the current data exchange does not correspond to the data exchange pattern associated with the particular user profile, and after associating the current data exchange with the current location of the user device, a fraud analysis is performed to confirm validity of the current data exchange.

In some instances, the current data exchange is performed via a mobile device. In other instances, the current data exchange is performed via a physical card at the location of the data exchange.

In some instances, receiving the third signal from the user device in response to the second signal includes receiving global positional system (GPS) data or assisted GPS (A-GPS) data from the user device corresponding to the time of the request for information on the current location of the user device.

In some instances, the location and data exchange histories of the plurality of user profiles are stored in separate databases, where the locations in a location database and the data exchanges in a data exchange database are linked by a key used to correlate location information and data exchange information.

Similar operations and processes may be performed in a system comprising at least one process and a memory communicatively coupled to the at least one processor where the memory stores instructions that when executed cause the at least one processor to perform the operations. Further, a non-transitory computer-readable medium storing instructions which, when executed, cause at least one processor to perform the operations may also be contemplated. Still further, the operations performed may be described as computer implemented software embodied on tangible, non-transitory media that processes and transforms the respective data. Some or all of the aspects may be computer implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

Figure 1:
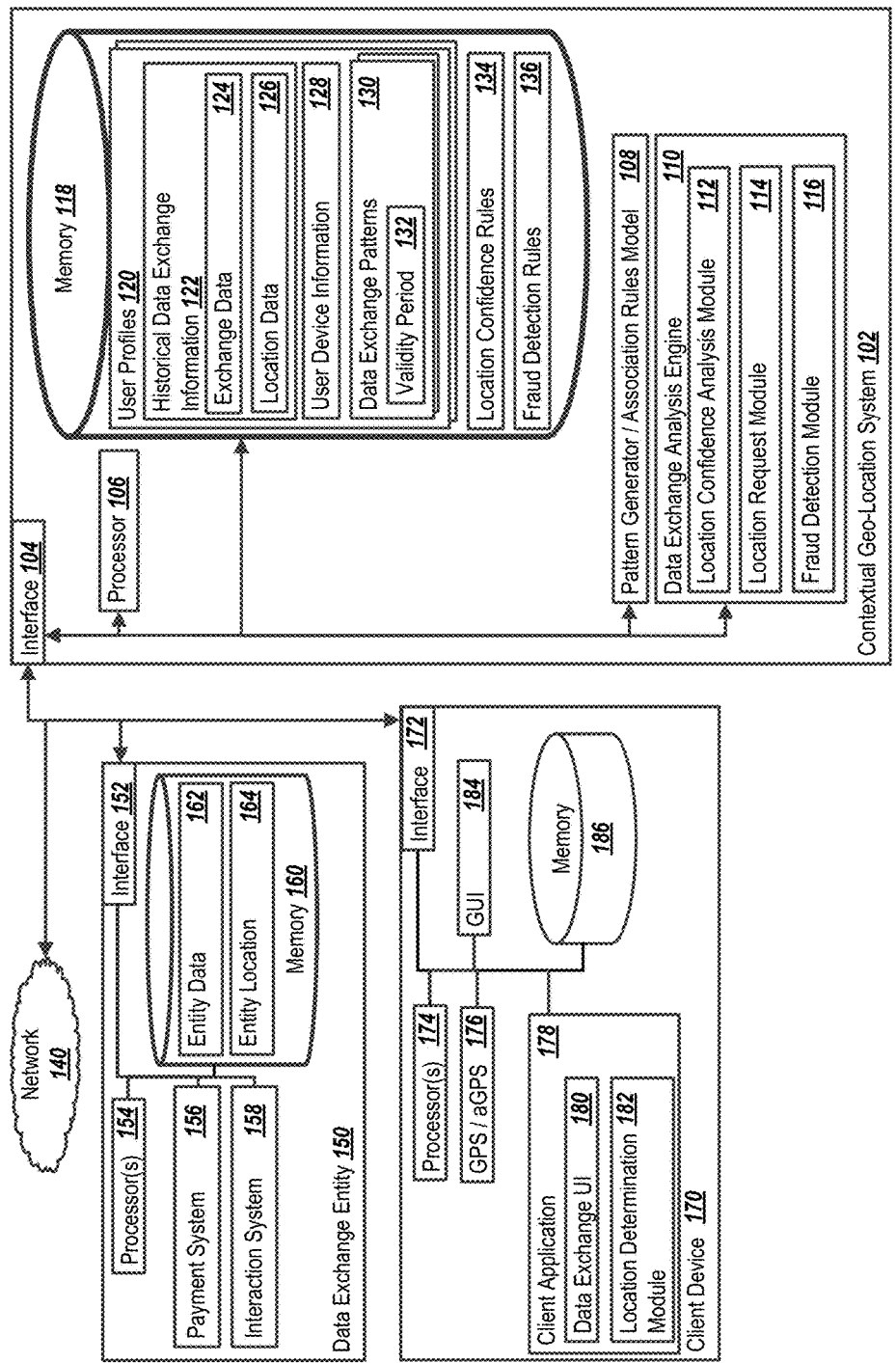
FIG. 1 is a block diagram illustrating an example system for augmenting ping timing for mobile devices based on contextual analysis of a current data exchange information based on historical data exchange data.

Presently, Global Positioning System (GPS) data is a large component of many mobile applications that use location to collect information regarding a user. As many mobile device users know, regular and constant GPS and assisted GPS (aGPS) calls from one or more applications can quickly diminish mobile device batteries, sometimes causing relatively new devices to experience early battery depletion issues. Further, any application's use of GPS can cost the user mobile device bandwidth and data plan usage. However, the usage of location information can be helpful and, in some cases, critical, to perform particular tasks. For example, a user's current location may be used to evaluate whether a particular transaction is valid, or whether a user is located in a particular location at which one or more responsive actions are to be taken. Further, marketers may use location as a basis to provide beneficial offers to customers, or to otherwise route appropriate communication to a user of a mobile device based on their presence in a particular area. By requesting or receiving that information from the mobile device, such providers can offer significant intelligent benefits to users and to application and account security.

In order to alleviate the drawbacks of geo-location pinging through the mobile device, a system is proposed that causes ping timing and location requests with less frequency while retaining the associated quality of geo-location tracking for the desired needs of the pinging entity. In one example, geo-location pinging that is executed in accordance with policies to minimize fraud may be augmented using contextual transactional or data exchange data. The contextual transactional or data exchange data can be collected and evaluated over an extended period of time in association with a particular user profile. The user profile can store or be associated with locational and transactional data obtained over a period of time sufficient to identify a standard set of locations and transactions commonly performed and executed in association with the user profile. In particular, a user's data exchanges and associated locations can be monitored and associated with the user profile. The data exchanges may be particular financial transactions (e.g., meal, coffee, and snack purchases, purchases at particular retailers, tolls paid at a particular location, etc.), transactional events (e.g., connecting to a particular wireless network or cell tower, using a mobile device or other identifier as a security access method, corresponding with a beacon associated with a particular location, etc.), a social network activity (e.g., checking into a business or location, etc.), and/or other data exchange actions associated with a particular location. Based on the series of data exchanges and their corresponding location, a user profile movement and data exchange pattern may be generated. Using this information, future data exchanges (e.g., purchases, check-ins, etc.) can be compared to the historical patterns associated with the user profile. Based on a particular current data exchange and the associated location, the comparison with the historical patterns can result in a confidence evaluation as to the current location of the user. When the confidence evaluation renders a score or evaluation above a confidence threshold and the location of the current data exchange is within a location matching the historical pattern or within a particular distance or area near the historical pattern, the historical pattern of prior data exchanges can be used to identify the location of the current data exchange. In doing so, the geo-location pinging of the user's device to determine location can be replaced by the current data exchange's associated location, as the two are correlated through the comparison and thus act as a proxy for the other. In some instances, the current data exchange may not be associated with a particular location. However, other information associated with the current data exchange may be used to match the current data exchange to a particular historical data exchange, and the location of the historical data exchange can be used as the location of the current data exchange. Where the current data exchange (or the location associated with the current data exchange) is not able to be linked to the historical data exchanges or to a pattern generated for the user profile, a standard request for location from the user's device can be applied.

The solutions described herein may be especially useful in financial security applications as both locational data and data exchange data (in such cases, financial transaction data) may be employed to detect fraud. Once a movement and spending patterns for a user profile are established, the locational information in regards to the user and their associated mobile wallet (and or traditional transactions) may ascertained from the financial transactions that a user has made previously and evaluated to determine whether a particular level of certainty can be met or exceeded that the user is following a particular idiosyncratic pattern corresponding to their prior activity, and not a potentially fraudulent one. Given the mapping of certainty to the transactional and movement behavior patterns for the corresponding user profile, the solution described herein may use the known transactional patterns of the user profile as a proxy for the user's current location and thus reduce drain on a user's mobile device by requesting or requiring confirmation of the current location via a locational ping from the mobile device or mobile application.

Another beneficial use of the described solution is for use by service providers in marketing or providing location-based notifications and messages. In such instances, current data exchanges may be identified. Instead of immediately requiring a confirmation of the location of the current data exchange, a determination can be made as to whether the current data exchange can be linked to a determined movement and data exchange pattern associated with the user profile of the user. If so, then the determined location from the current data exchange information or from the historical data exchange information can be used as a proxy for the location and associated with the current data exchange. Based on that location, one or more rules associated with such marketing and location-based notifications can be evaluated and any matching messages transmitted to the user's mobile device, all without requiring a further confirmation of location through the standard pinging process.

One beneficial result of the technology described herein is the ability to track a particular user when the user has indicated that particular apps or functionality can only track the user (e.g., by using background location-based services) when the user has the app open or turned on. In this case the third part app and the associated third party server may still be able to send the user location-specific, location-triggered, or location-relevant targeted marketing and promotion notifications and messages without the user having the mobile app turned on or activated. As many users may turn location services off for specific applications in an attempt to monitor and manage data and battery usage, the present solution allows users to turn off or otherwise reduce those services with particular apps while still receiving location-related information. Users can be provided with an opt-out option to avoid receiving unwanted messages from mobile apps, but if the only reason for not receiving messages is the battery or data drain, the present solution solves the issue.

Turning to the illustrated example implementation, FIG. 1 is a block diagram illustrating an example system 100 for augmenting ping timing for mobile devices based on contextual analysis of a current data exchange information based on historical data exchange data. Specifically, the illustrated system 100 includes or is communicably coupled with a contextual geo-location system 102, a client device 170, a data exchange entity 150, and a network 140. System 100 is a single example of a possible implementation, with alternatives, additions, and modifications possible for performing some or all of the described operations and functionality. Although shown separately, in some implementations, functionality of two or more systems or servers may be provided by a single system or server. In some implementations, the functionality of one illustrated system or server may be provided by multiple systems, servers, or computing devices, including those physically or logically local or remote to each other. Any combination or permutation of systems may perform the functionality described herein.

As used in the present disclosure, the term "computer" is intended to encompass any suitable processing device. For example, client device 170, contextual geo-location system 102, and data exchange entity 150 may be any computer or processing device such as, for example, a blade server, general-purpose personal computer (PC), Mac®, workstation, UNIX-based workstation, embedded system or any other suitable device. Moreover, although FIG. 1 illustrates particular components as a single element, those components may be implemented using a single system or more than those illustrated, as well as computers other than servers, including a server pool or variations that include distributed computing. In other words, the present disclosure contemplates computers other than general-purpose computers, as well as computers without conventional operating systems. Client device 170 may be any system which can request data, execute an application, and/or interact with the contextual geo-location system 102 and/or the data exchange entity 150. The client device 170, in some instances, may be any other suitable device, including a mobile device, such as a smartphone, tablet, smartwatch, or any other mobile computing device. In general, each illustrated component may be adapted to execute any suitable operating system, including Linux, UNIX, Windows, Mac OS®, Java™, Android™, Windows Phone OS, or iOS™, any real-time OS among others.

The contextual geo-location system 102 can perform the functionality associated with monitoring data exchanges performed by particular users over time in order to generate one or more data exchange patterns 130 that are associated with a particular user profile 120. As a sufficient amount of data exchanges that are associated with a particular location are obtained, the system 102 can generate or be provided one or more data exchange patterns 130 based on a historic set of data exchange information 122, where the historical data exchange information 122 includes at least particular data exchanges 124 and location data 126 associated with those changes. The data exchange data 124 and the location data 126 may be stored in a single database together, or may be stored separately. The data 124, 126 can be linked by a key used to correlate the data such that the data can be used in determining the one or more patterns 130 for the user profile 120. In some instances, such information may also include time and/or date information to allow the data exchange patterns 130 to be further specific, thereby identifying particular times or dates during which a particular pattern 130 may be valid. Once such patterns 130 are available, those patterns 130 can be used to evaluate whether, in connection with a current data exchange identified at the system 102 (e.g., via a data exchange entity 150), the current data exchange is expected or meets a previously generated data exchange pattern 130. Expecting or meeting the pattern 130 may include determining a confidence or certainty level or score associated with the current data exchange, the confidence level identifying whether the current data exchange is associated with a location that is within at least one of the data exchange patterns 130 associated with a user profile of the user associated with the current data exchange. If, based on the comparison, the current data exchange is viewed as above a required confidence level as being in line with a data exchange pattern 130, then the location associated with the current data exchange is accepted as valid and associated with the current data exchange. Information about the current data exchange can then be stored in the historical data exchange information 122 for the user profile associated with user. If, however, the comparison indicates that the correlation to a particular existing data pattern 130 is below the threshold confidence level, then the contextual geo-location system 102 can transmit a request for the current location of the user's mobile device, using the received location of the mobile device to confirm the location associated with the current data exchange.

In some instances, the system 102 may be associated with a financial institution such as a bank or credit union, a credit card issuer, or other institutions. In some instances, the system 102 may be associated with alternative payment systems, including non-traditional financial providers, such as mobile application-related payments such as Apple Pay, Google Wallet, Android Pay, PayPal, Venmo, and other providers. Still further, the system 102 may be associated with businesses and other entities managing gift cards and gift balances through a mobile device and user profile. In some instances, system 102 may correlate and combine payment information associated with two or more of these providers, as well as other providers such as social networks (e.g., Facebook, Twitter, Snapchat, Instagram, etc.). Data exchanges as used herein may include financial transactions, social network activities (e.g., check-ins, location-associated posts or submissions, etc.), and location-based actions (e.g., using a mobile device to obtain access to a location), among others.

As illustrated, the contextual geo-location system 102 includes interface 104, processor 106, a pattern generator 108, a data exchange analysis engine 110, and memory 118. Interface 104 is used by the system 102 for communicating with other systems in a distributed environment—including within the environment 100—connected to the contextual geo-location system 102 and/or network 140, e.g., client device(s) 170, and any data exchange entities 150, as well as other systems or components communicably coupled to the network 140. Generally, the interface 104 comprises logic encoded in software and/or hardware in a suitable combination and operable to communicate with the network 140 and other communicably coupled components. More specifically, the interface 104 may comprise software supporting one or more communication protocols associated with communications such that the contextual geo-location system 102, network 140, and/or interface's hardware is operable to communicate physical signals within and outside of the illustrated environment 100.

Network 140 facilitates wireless or wireline communications between the components of the environment 100 (e.g., between combinations of the system 102, client device(s) 170, and/or the data exchange entities 150, among others) as well as with any other local or remote computer, such as additional mobile devices, clients, servers, remotely executed or located portions of a particular component, or other devices communicably coupled to network 140, including those not illustrated in FIG. 1. In the illustrated environment, the network 140 is depicted as a single network, but may be comprised of more than one network without departing from the scope of this disclosure, so long as at least a portion of the network 140 may facilitate communications between senders and recipients. In some instances, one or more of the illustrated components (e.g., the contextual geo-location system 102) may be included within network 140 as one or more cloud-based services or operations. The network 140 may be all or a portion of an enterprise or secured network, while in another instance, at least a portion of the network 140 may represent a connection to the Internet. In some instances, a portion of the network 140 may be a virtual private network (VPN) or an Intranet. Further, all or a portion of the network 140 can comprise either a wireline or wireless link. Example wireless links may include 802.11a/b/g/n/ac, 802.20, WiMax, LTE, and/or any other appropriate wireless link. In other words, the network 140 encompasses any internal or external network, networks, sub-network, or combination thereof operable to facilitate communications between various computing components inside and outside the illustrated environment 100. The network 140 may communicate, for example, Internet Protocol (IP) packets, Frame Relay frames, Asynchronous Transfer Mode (ATM) cells, voice, video, data, and other suitable information between network addresses. The network 140 may also include one or more local area networks (LANs), radio access networks (RANs), metropolitan area networks (MANs), wide area networks (WANs), all or a portion of the Internet, and/or any other communication system or systems at one or more locations.

The system 102 also includes one or more processors 106. Although illustrated as a single processor 106 in FIG. 1, multiple processors may be used according to particular needs, desires, or particular implementations of the environment 100. Each processor 106 may be a central processing unit (CPU), an application specific integrated circuit (ASIC), a field-programmable gate array (FPGA), or another suitable component. Generally, the processor 106 executes instructions and manipulates data to perform the operations of the contextual geo-location system 102, in particular those related to executing the pattern generator 108 and the data exchange analysis engine 110. Specifically, the processors 106 execute the algorithms and operations described in the illustrated figures, as well as the various software modules and functionalities, including the functionality for sending communications to and receiving transmissions from the data exchange entities 150 and/or the client device(s) 170, as well as to other devices and systems. Each processor 106 may have a single core or multiple cores, with each core available to host and execute an individual processing thread. In some instances, a cloud-based solution may use one or more remotely or otherwise available processors 106 and their cores to allow for further operations and optimization of operations via parallel processing.

Regardless of the particular implementation, "software" includes computer-readable instructions, firmware, wired and/or programmed hardware, or any combination thereof on a tangible medium (transitory or non-transitory, as appropriate) operable when executed to perform at least the processes and operations described herein. In fact, each software component may be fully or partially written or described in any appropriate computer language including C, C++, Objective-C, JavaScript, Java™, Visual Basic, assembler, Perl®, Swift, HTML5, any suitable version of 4GL, as well as others.

Figure 4:
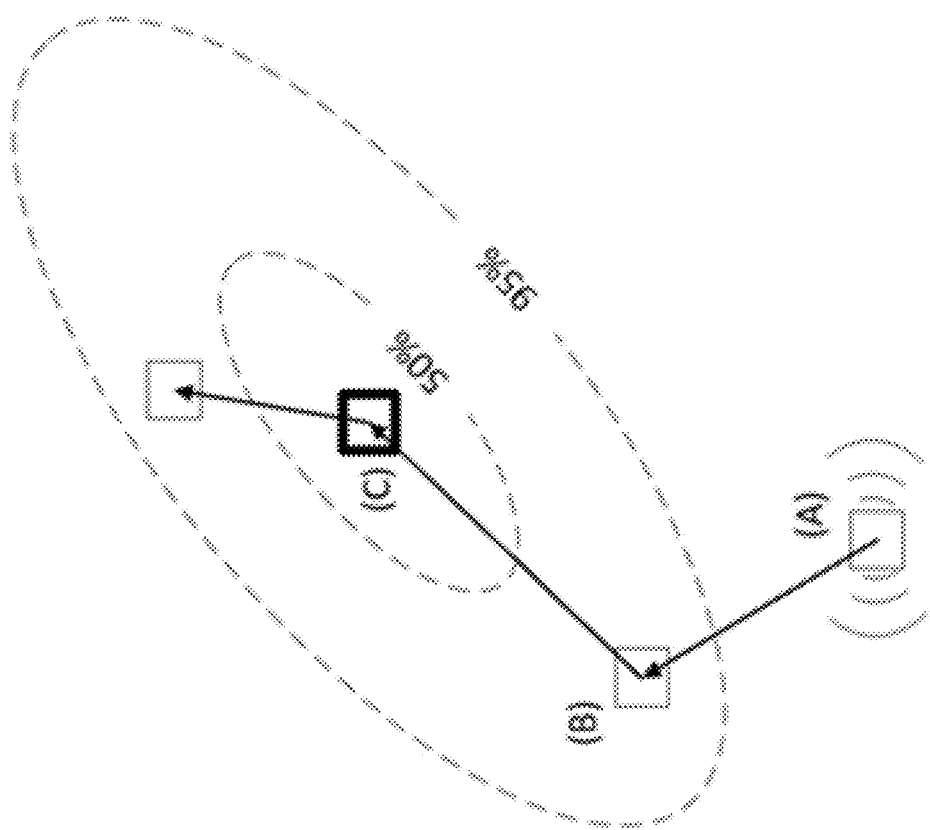
FIGS. 4-6 are example illustrations of location and data exchange patterns associated with a particular user profile.
Figure 5:
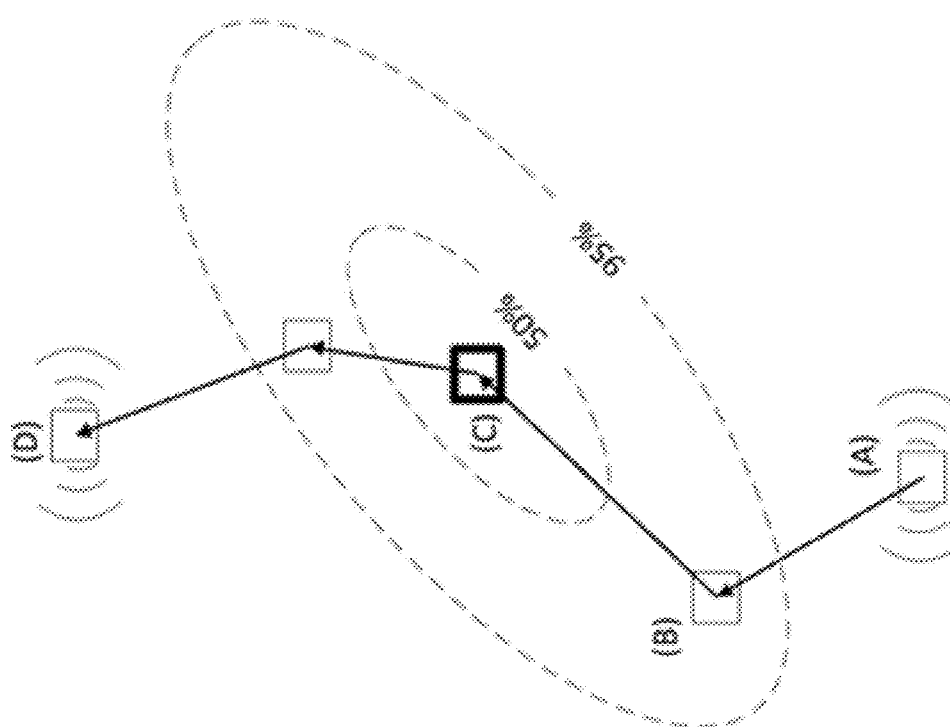
Figure 6:
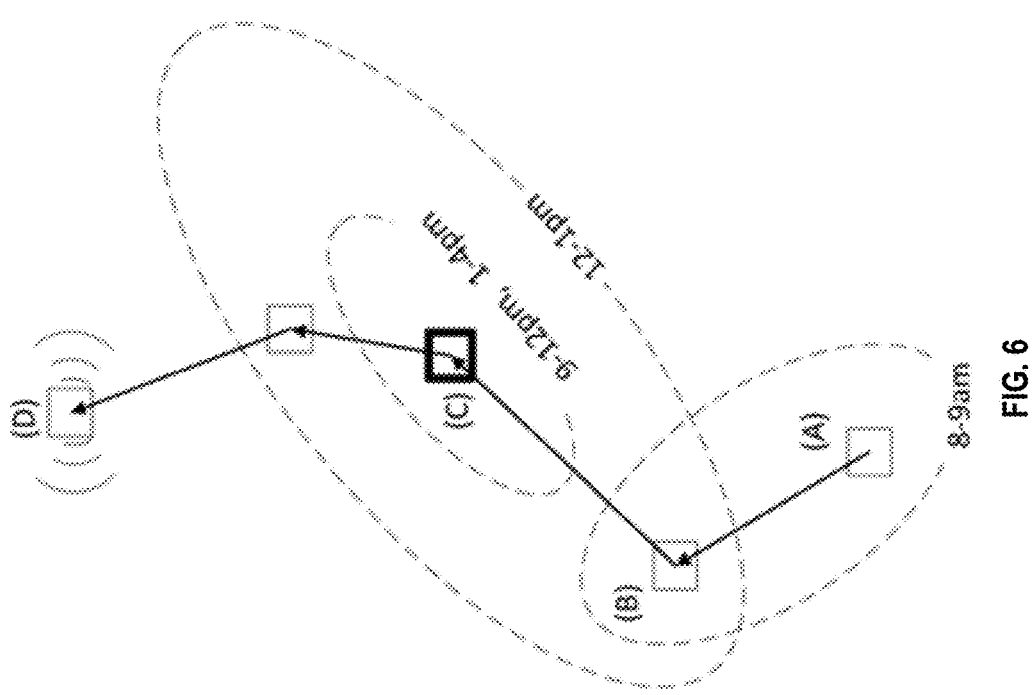

The pattern generator 108 may be any application, framework, agent, or other software capable of interpreting historical data exchange information 122 and generating one or more data exchange patterns 130, where each data exchange pattern 130 can be associated with a particular user profile based on the prior data exchange actions of a user. The pattern generator 108 may use any suitable pattern recognition algorithm or tools, including association rule learning, machine learning, data mining, and knowledge discovery in databases. In some instances, the pattern generator 108 may be separate or remote from the contextual geo-location system 102, with the patterns 130 provided to the system 102 for storing or accessible upon request. The pattern generator 108 can be executed periodically, in response to new data, or upon manual request (e.g., by an administrator) to generate updated data exchange patterns 130. As noted, some patterns 130 may be determined to be valid only during certain times of the day or on certain days. For example, data exchanges may be associated with a user's commute to work or school, such that the data exchanges only happen between a normal time period on certain weekdays. Using that information, the data exchange pattern 130 may be associated with a validity period 132 matching or nearing that normal time period. Data exchanges that would otherwise match the generated pattern 130, but which occur at a time outside the validity period 132, will not meet the confidence level required to apply the determined location without the need for a ping. In some instances, the data exchange patterns 130 may include or otherwise identify or define a particular location or set of locations associated with a user's likely location. FIGS. 4-6 provide example data exchange patterns 130 including maps of a particular area or set of locations.

The data exchange analysis engine 110 may be any application, framework, agent, or other software capable of performing the comparison of the current data exchange to the historical data exchange information 122 and the data exchange patterns 130. As illustrated, the data exchange analysis engine 110 may also perform or otherwise initiate the request to the client device associated with the current profile for current location information. To perform the comparison, the data exchange analysis engine 110 can identify a set of location confidence rules 134 stored in memory 118, where the set of location confidence rules 134 define requirements for the comparison of the current data exchange location to the data exchange pattern 130. In some instances, that may include a distance from a particular location or area defined by the data exchange patterns 130. Based on the location of the current data exchange as compared to the distance from the location or area defined in the pattern 130, a confidence level may be determined by the data exchange analysis engine 110. Alternatively, the location confidence rules 134 may be used to determine whether a particular location associated with the current data exchange is within an area defined in the data exchange pattern 130. In some instances, areas may be mapped such that confidence levels are higher nearest locations associated with one or more historical data exchange instances as determined by the pattern generator 108, with lower levels of confidence expanding outside of those locations. For example, locations within one block of a common location may be associated with a 95% confidence level, while locations outside five (5) blocks of a prior location may be associated with a 45% confidence level. If the confidence level threshold is 75%, locations outside five (5) blocks of the prior location will not satisfy the rules for avoiding further user device pings.

The location confidence analysis module 112 of the data exchange analysis engine 110 can perform these determinations based on a comparison of the current data exchange and the data exchange patterns 130 associated with the current user profile 120. In some instances, the location confidence analysis module 112 may need to derive additional information about the current data exchange before being able to perform the comparison. For example, if the entity with which a data exchange is performed is a business with multiple locations, the particular location associated with the data exchange must be determined or derived. Such information may be available from a recent location of the user device associated with the user profile 120, metadata provided with the information defining the current data exchange that may be received from the data exchange entity 150 (e.g., transactional data associated with a sale or service performed), or any other suitable information. The location confidence rules 134 described above can provide the required confidence threshold needed to avoid pinging the user device associated with the current user profile 120 for a location. The threshold included in the location confidence rules 134 may differ for different usages of the present solution. Further, the threshold may vary based on certain data exchange patterns. If a particular pattern 130 does not include significant departures from a normal route in the historical data exchanges, even small variations from the route may require a ping. Alternatively, where a pattern 130 identifies regular variations from a particular route, some variance may be allowed. Additionally, if used in a fraud detection implementation, higher thresholds may be required where security is of significant importance. Lower risk implementations may allow a lower confidence level to be used as the location without the need for a ping.

The location request module 114 of the data exchange analysis engine 110 performs or initiates a request to the user device associated with the user profile 120 for a location-based ping from the user device when the confidence threshold is not met, or is not able to be determined. The request can include a request for GPS or aGPS data, or other location-related indications (e.g., nearby wireless networks, etc.), and can be sent via interface 104 to the client device 170. The particular information about where to send the request can be identified using user device information 128 associated with a particular user profile 120. This information 128 can identify a particular phone model, media access control (MAC) address, or other identifiers used to identify and subsequently communicate with one of the one or more user devices 170 associated with the user and the user profile 120. In some instances, more than one device may be listed or available in the user device information 128. The identified device may be associated with a mobile wallet or may uniquely identify a particular device associated with the user. Using the particular identifier, the request for location can be sent to the appropriate client device 170 used to act as a proxy for the user of the user profile 120, with an expectation that the location of the client device 170 matches the current location of the user.

The data exchange analysis engine 110, in some instances, may be associated with a fraud detection module 116. In some instances, the fraud detection module 116 may be separate from the contextual geo-location system 102, and may in fact be its own system or application. In the current instance, any fraud determination is separate from the determination of whether prior movement and data exchanges of the user profile match or correspond to the current location of the current data exchange. The fraud detection module 116 may perform further determinations based on the amount or type of data exchange, as well as consider whether the current location of the data exchange itself causes any fraud warnings to be triggered alone or in combination with the determined location of the transaction. The fraud detection module 116 can use a set of fraud detection rules 136 (illustrated in memory 118) as the basis for any such detection. In some instances, the contextual geo-location analysis can be included in a fraud detection system, determining whether particular transactions trigger a potential fraud risk or other issues.

System 102 includes memory 118. In some implementations, contextual geo-location system 102 includes a single memory or multiple memories. The memory 118 may include any type of memory or database module and may take the form of volatile and/or non-volatile memory including, without limitation, magnetic media, optical media, random access memory (RAM), read-only memory (ROM), removable media, or any other suitable local or remote memory component. The memory 118 may store various objects or data, including caches, classes, frameworks, applications, backup data, business objects, jobs, web pages, web page templates, database tables, database queries, repositories storing business and/or dynamic information, and any other appropriate information including any parameters, variables, algorithms, instructions, rules, constraints, or references thereto associated with the purposes of the contextual geo-location system 102. Additionally, the memory 118 may store any other appropriate data, such as VPN applications, firmware logs and policies, firewall policies, a security or access log, print or other reporting files, as well as others. As illustrated, memory 118 includes, for example, a plurality of user profiles 120, each associated with at least one data exchange pattern 130, the set of location confidence rules 134, and the set of fraud detection rules 136, described herein. Memory 118 may be local to or remote to the system 102, and may be available via network 140 in such instances where not locally available. Further, some or all of the data included in memory 118 in FIG. 1 may be located outside of system 102.

The data exchange entity 150 may be system, server, or other computing device associated with a particular entity, business, platform, or computing system with which a particular data exchange is performed or interacted with by a particular user. The data exchange entity 150 may be associated with a payment system 156, an interaction system 158, or any other type of interaction or data exchange that may be provided to the contextual geo-location system 102 for processing. The data exchange entity 150 may be or may be associated with a point-of-sale (POS), or a device scanning or otherwise identifying a user or user device associated with a user at a location. In some instances, the data exchange entity 150 may be associated with a business selling goods or providing services. In other instances, the data exchange entity 150 may be a business, enterprise, software system, or another entity which can connect with a user's device or other user identifier to be associated with and perform a particular data exchange. For example, in such instances a user may access a computer system where that computer system has a particular location for access (e.g., a library, a business where interactive check-ins or registrations occur, a school front-office or security entrance, a ticket-taking or ticket authenticating system, etc.), or may be determined as present by a wireless beacon or other location-related set of information derived from an interaction with the user or the client device 170. The interaction system 158 and/or the payment system 156 can communicate information to the contextual geo-location system 102 related to the data exchange itself, including by providing a set of entity data 162 (which may include data exchange data) and a set of entity location data 164 (where the entity data 162 and entity location data 164 are stored in memory 160, which may be similar to or different than memory 118), as well as information on the specific user and/or user-related client device 170, and the details of the data exchange (e.g., a transaction amount, a type of interaction, etc.). This information can be used in building the historical data exchange information 122 and building a history and pattern 130 of the particular user profile associated with the user. In some instances, the data exchange entity 150 may receive information regarding a data exchange from a physical activity or transaction not associated with the client device 170 (e.g., a physical credit card transaction). The data exchange entity 150 can then provide information about the transactions or other data exchange to the geo-location system 102, which can correlate information about the data exchange to a particular user profile 120 and perform its analysis. Further, in some instances, the data exchange entity 150 may correspond with a backend payment system or other intermediary before information is provided to the contextual geo-location system 102, where the backend payment system or other intermediary provides the data exchange information to the geo-location system 102 for consideration of whether to confirm or request location data from the client device 170.

As illustrated, the data exchange entity 150 includes interface 152 and one or more processors 154, where the interface 152 is similar to or different from interface 104 and the one or more processors 154 may be similar to or different from processor 106. The data exchange entity 150 can use the network 140 or any suitable communication network to interact with the contextual geo-location system 102, the client device 170, and any other suitable components.

Illustrated system 100 includes at least one client device 170, and may include a plurality of the client devices 170 in some instances. The client device 170 may generally be any computing device operable to connect to or communicate within the system 100 via the network 140 using a wireline or wireless connection. In general, the client device 170 comprises an electronic computer device operable to receive, transmit, process, and store any appropriate data associated with the system 100 of FIG. 1. The client device 170 can include one or more client applications, including the client application 178. In some instances, the client device 170 may comprise a device that includes an input device, such as a keypad, touch screen, or other device(s) that can interact with the client application 178 and other functionality, and an output device that conveys information associated with the operation of the applications and their application windows to the user of the client device 170. Such information may include digital data, visual information, or a graphical user interface (GUI) 184, as shown with respect to the client 170. In general, client device 170 comprises an electronic computer device operable to receive, transmit, process, and store any appropriate data associated with the environment 100 of FIG. 1.

Client application 178 is any type of application that allows the client device 170 to request and view content on the client device 170. In some instances, client application 178 may correspond with one or more backend applications or functionality, including the contextual geo-location system 102. In some instances, the client application 178 may be an agent or client-side version of the one or more applications running on a backend system, such as an agent or client-side version of the contextual geo-location system 102, or another backend system using the contextual geo-location system 102. In the present solution, the client device 170 can be used to provide a location of a particular user associated with the client device 170. In many instances, the client device 170 may be a mobile device, including but not limited to a smartphone, a tablet computing device, a laptop/notebook computer, a smartwatch, or any other suitable device capable of providing location information in response to location requests from the contextual geo-location system 102. One or more client applications 178 may be present on a client device 170, and can provide varying functionality. In some instances, client application 178 may be a web browser, mobile application, cloud-based application, or dedicated remote application or software capable of interacting with at least some of the illustrated systems via network 140 to request information from and/or respond to one or more of those systems.

In some instances, at least one the client application 178 may be able to perform data exchange operations with at least one data exchange entity 150. Such operations may include financial transactions, payments, registration or interactions with a data exchange entity, security-related operations associated with the data exchange entity 150, or other actions. In some instances, the client application 178 may be a wireless payment solution associated with a mobile operating system, such as Apple Pay or Android Pay, among others, as well as other third-party payment apps. Further, the client application 178 may be associated with a particular vendor or business, where vendor-specific payment or transaction rails are used for purchases (e.g., via vendor-specific credit, debit, or gift card accounts, etc.). Different client applications 178 executed on a single device 170 or executed on a combination of devices 170 associated with a particular user may be used to provide data for the set of historical data exchange information 122 and used in developing the data exchange pattern 130 for the particular user's user profile 120.

As illustrated, the client application 178 may include a data exchange UI 180, which can provide a visual interface allowing user interaction to perform the one or more data exchanges available or executable with the client application 178, as well as other functionality associated with the client application 178. Additionally, the client application 178 may include a location determination module 182. The location determination module 182 may be functionality within or separate from the client application 178 for obtaining or identifying a current location of the client device 170. The current location can be identified as part of a data exchange, as well as in response to a request from the location request module 114. The location determination module 182 may access a GPS or aGPS system or component 176 to identify the current location of the client device 170. Alternatively, the location determination module 182 may perform a contextual analysis to identify the location based on non-GPS information, such as a current wireless network or set of wireless networks available to the device 170, one or more beacons connected to or located nearby the client device 170, a recent operation performed by the client application 178 or other functionality (e.g., a prior use of the client device 170 to obtain access to a physical location), a last-identified location, or any other suitable means.

As illustrated, the client 170 may also include an interface 172 for communication (similar to or different from interfaces 104, 152), a processor 174 (similar to or different from processors 106, 154), memory 186 (similar to or different from memory 118, 160), and GUI 184. GUI 184 of the client device 170 interfaces with at least a portion of the environment 100 for any suitable purpose, including generating a visual representation of the client application 178 (e.g., via the data exchange UI 180). In particular, the GUI 184 may be used to present results or feedback from the data exchange entity 150 related to a particular data exchange. GUI 184 may also be used to view and interact with various Web pages, applications, and Web services located local or external to the client device 170. Generally, the GUI 184 provides the user with an efficient and user-friendly presentation of data provided by or communicated within the system. The GUI 184 may comprise a plurality of customizable frames or views having interactive fields, pull-down lists, and buttons operated by the user. For example, the GUI 184 may provide interactive elements that allow a user to view or interact with information related to the operations of processes associated with the various systems 102, 150, among others. In general, the GUI 184 is often configurable, supports a combination of tables and graphs (bar, line, pie, status dials, etc.), and is able to build real-time portals, application windows, and presentations. Therefore, the GUI 184 contemplates any suitable graphical user interface, such as a combination of a generic web browser, a web-enabled application, intelligent engine, and command line interface (CLI) that processes information in the platform and efficiently presents the results to the user visually.

While portions of the elements illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

Figure 2:
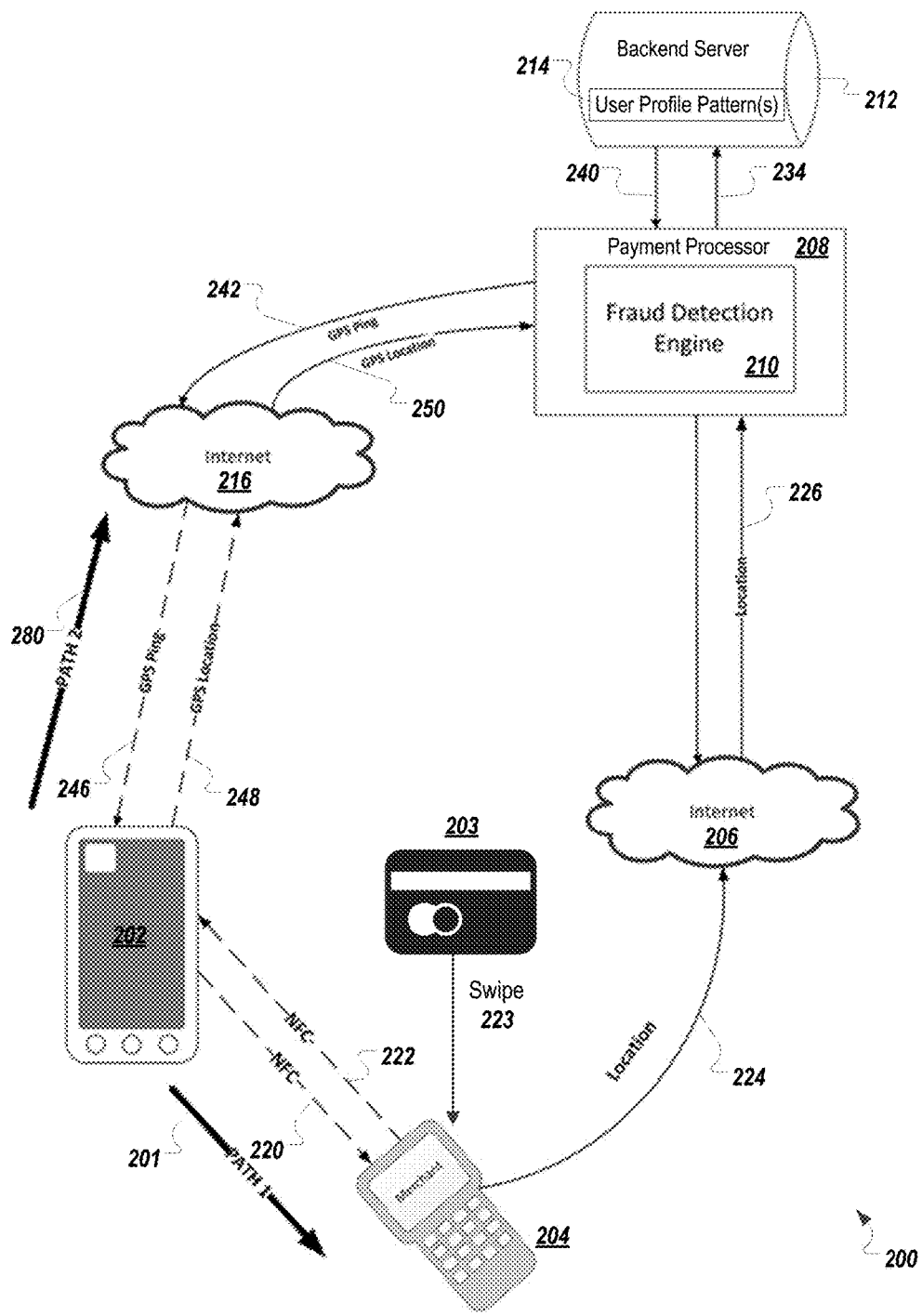
FIG. 2 is a flowchart of an example set of interactions related to augmenting the ping timing for mobile devices based on contextual analysis of a current data exchange information based on historical data exchange data.

FIG. 2 is a flowchart 200 of an example set of interactions related to augmenting the ping timing for mobile devices based on contextual analysis of a current data exchange information based on historical data exchange data. In this example, a financial transaction is entered into by a merchant 204 and a user. When a user makes a transaction using their mobile device 202 at a merchant 204, the location of the mobile device 202 can be inferred in one of two ways. A standard operation may be path 2 (280), while a data exchange analysis can be used in illustrated path 1 (201).

As illustrated, the flowchart 200 includes a user's mobile device 202 (or alternatively, a physical payment card 203 (e.g., credit or debit)), a merchant payment system 204, one or more networks providing Internet connections (206, 216) to allow the transaction to be processed and determine a location of the mobile device 202, a payment processor 208 including a fraud detection engine 210, and a backend server or app server 212 managing (and in some cases, generating) one or more user profiles and associated patterns 214.

Initially, the mobile device 202 is associated with a purchase or other transaction with the merchant payment system 204 via near field communication (NFC) interactions 220, 222. Alternatively, the physical payment card 203 may be used via a swipe 223 or PIN-based transaction at the merchant payment system 204. Information about the transaction, including the location of the transaction, is sent from the merchant payment system 204 to the payment processor 208 via Internet 206 (as shown by arrows 224 and 226). At the payment processor 208, a fraud detection engine 210 can be used to evaluate whether a particular transaction is viewed as potentially fraudulent. In some instances, such a determination can be made based on whether the transaction occurs in a location expected for the user. Additional fraud detection rules may be applied based on an amount spent, although this example deals specifically with the location of the user.

In response to receiving the location from the merchant payment system 204, the payment processor 208 can provide the location of the transaction to a backend server 212 (arrow 234), where the backend server 212 is associated with the management of and comparisons to one or more user profiles, and specifically, the evaluation of a particular location of a transaction to a particular user profile pattern 214. The backend server 212 may be a part of the payment processor 208, a separate system performing contextual geo-location evaluations, or an application programming interface (API) or cloud-based application that provides a similar service. The location provided by the payment processor 208 can include an identification of the user such that the particular user profile can be accessed and corresponding user profile patterns 214 applied to the evaluation.

In some instances, one or more of the user profile patterns 214 may be associated with a particular time period in which the patterns are associated or valid, and the information about the transaction may include a time of the transaction such that the appropriate patterns are applied to the evaluation. In any event, in response to receiving the location information and user identifier, the backend server 212 can perform a determination as to whether the location of the transaction matches or corresponds to, within a particular level of certainty or confidence, the expected location of the user. If the location sufficiently matches or corresponds to the expected location of the user, then the location from the transaction may be returned to the payment processor 208 (arrow 240) and used as part of the fraud detection engine's 210 analysis or otherwise associated with the transaction.

On the other hand, should the location associated with the transaction not sufficiently match or otherwise correspond to the expected location described in the user profile pattern 214, the backend server 212 can relay this to the payment processor 208. Based on the non-match, the payment processor 208 can initiate a traditional locational ping of the mobile device 202 associated with the user profile with which the transaction was also associated. Because of this, transactions performed by a physical payment card 203 can still be evaluated according to the user profile pattern 214. As the user profile links the profile to one or more particular mobile devices 202, the location of the mobile device 202 can be used as a proxy for the location of the user. Suspicious or non-standard data exchanges associated with a location outside the expected area of the user profile patterns 214 can be tested through the standard GPS or other type of locational ping.

To confirm and check the user's location, a request is sent from the payment processor 208 to the mobile device 202 via Internet 216 (as shown by arrows 242, 246). This uses the traditional operations to perform the location check. Once the locational ping is received, the mobile device 202 can perform a locational determination (e.g., via GPS, aGPS, or another suitable locational determination), and can then return that information to the payment processor (as shown by arrows 248, 250). The returned location can then be used by the payment processor 208 to perform the further fraud analysis, such as if the location returned by the mobile device 202 is significantly different than that provided by the merchant payment system 204. It is noted, however, that a different location for the mobile device 202 as compared to the merchant payment system 204 may be based on any number of reasons, including the device not being at the location of the merchant payment system 204, the payment being an online transaction, or another similar reason. However, based on a combination of fraud detection rules, the fraud detection engine 210, based on the location of the mobile device 202 being different from the location of the transaction, as well as other factors considered by the system, may return a potential fraud notification. In some instances, the current transaction may be denied or disallowed based on the potential fraud notification being triggered.

As noted previously, the fraud or security-related implementation is only one of many example uses for the present solution. The example of FIG. 2 is not meant to be limiting, but instead provide an example to explain the solution. For example, in some implementations, the innovation and solutions described herein can be beneficial for targeted marketing applications, where when it is determined that a user is in a particular vicinity to one or more vendors or businesses, one or more of the vendors or businesses may be able to send the user targeted promotions or interactions without impacting the mobile device's GPS and reducing the battery consumption in turn.

Figure 3:
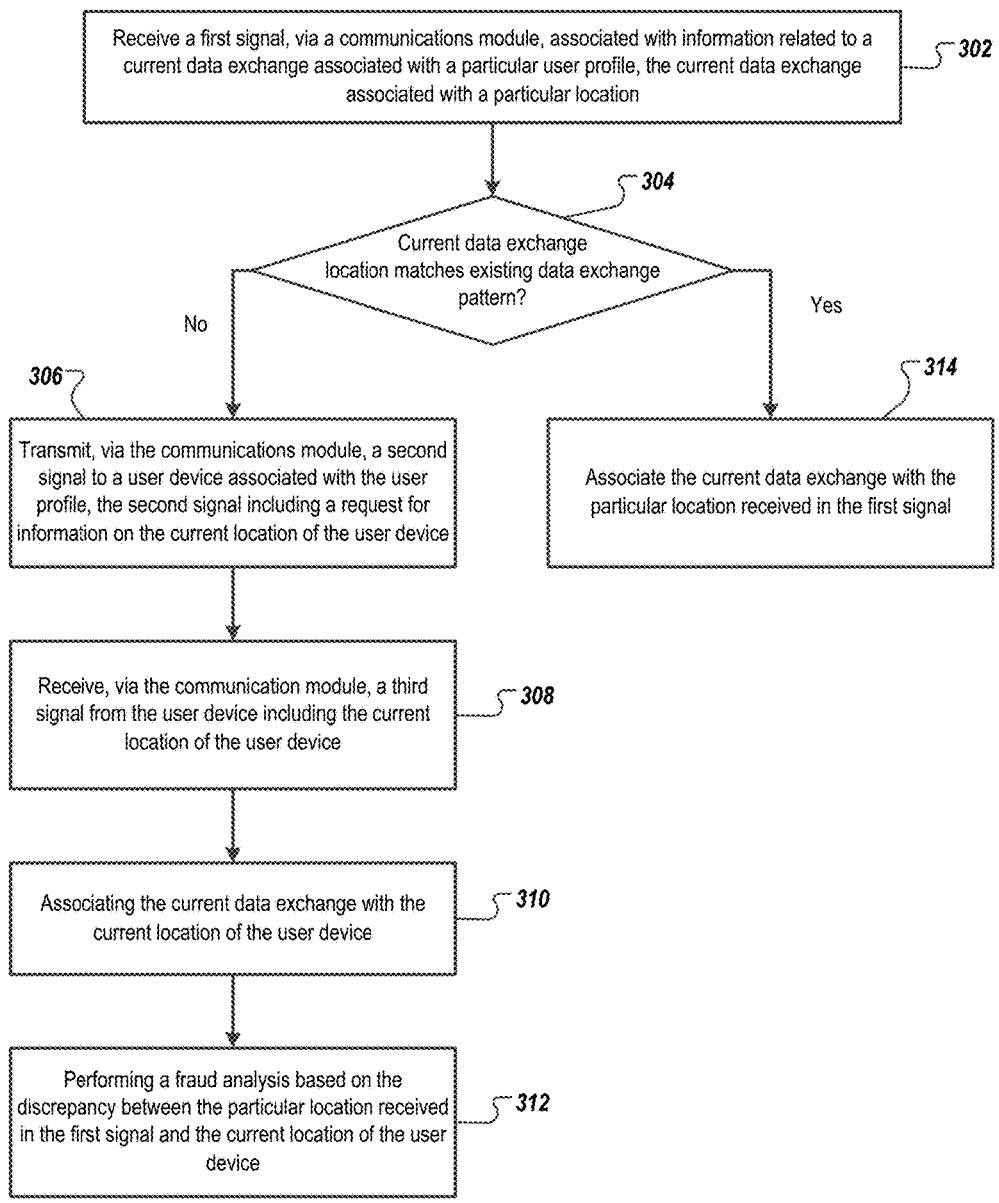
FIG. 3 is a flowchart of an example method for augmenting ping timing for mobile devices.

FIG. 3 is a flowchart of an example method 300 for augmenting ping timing for mobile devices. It will be understood that method 300 and related methods may be performed, for example, by any suitable system, environment, software, and hardware, or a combination of systems, environments, software, and hardware, as appropriate. For example, a system comprising a communications module, at least one memory storing instructions and other required data, and at least one hardware processor interoperably coupled to the at least one memory and the communications module can be used to execute method 300. In some implementations, the method 300 and related methods are executed by one or more components of the system 100 described above with respect to FIG. 1.

At 302, a first signal is received (e.g., via a communications module) associated with information related to a current data exchange associated with a particular user profile. In some instances, the particular user profile may be one of a plurality of user profiles. The current data exchange can be associated with a particular location. The current location may be received from metadata received in connection with the information about the current data exchange. In some instances, the information may be received from a participant in the current data exchange, or the information may be relayed back from the participant. In some instances, the identity of one participant in a particular data exchange (e.g., a particular merchant or entity) can be used to identify or otherwise derive the location of the data exchange. In some instances, the data exchange may be associated with an input terminal having a particular ID, where the data exchange request data packet contains both the specific request and the terminal ID, where the terminal ID is associated with locational information that can be linked to the current location of the particular data exchange. The terminal ID can be stored on a remote server or other location, and can be accessed when the data exchange request is received to associate the request with the corresponding location. Alternatively, or in addition, an association can be built between a particular merchant ID and the location that is received when the mobile device is pinged immediately after a first data exchange (e.g., transaction) is executed. During future transactions associated with the particular merchant ID, the location associated with the ping (or a series of pings for other transactions) can be associated with the particular merchant ID, such that future data exchange requests associated with the particular merchant ID are automatically associated with that determined location.

At 304, a determination is made as to whether the location associated with the current data exchange matches or otherwise corresponds to an existing data exchange pattern associated with the particular user profile. Each user profile can be associated with one or more user devices (e.g., mobile devices) and accounts. Over time, the location of the user devices can be monitored to identify and determine particular patterns of movement and previous, or historical, data that identifies locations at which the user associated with the user profile may be. This information can be tracked based on the location of particular data exchanges (e.g., transactions, purchases, social network activities, connections to particular networks, actions requiring the presence of the user device to occur, etc.), which is managed by a backend system or combination of systems. The particular user profiles can be associated with particular validity periods. For example, a user's normal patterns of behavior on Mondays may be to visit a coffee shop local to the user's home as identified by a regular purchase at the beginning of a commute, use a mobile app to pay transport fare (e.g., a bus or train purchase) from a stop or station near to the coffee shop, and arrive at a place of business at a particular location. This path may be consistent on weekdays, and may be associated with activities performed from 8:00 am to 10:00 am. Based on this, a user profile pattern associated with weekdays from 8:00 am to 10:00 am can be generated that provides information on the normal route taken to the place of business, as well as typical purchases or transactions that are made. Multiple different patterns for a particular can be generated based on this monitored activity. Further, new activity can be used to regenerate or update previously generated user profile patterns.

If the determination indicates that the current data exchange corresponds to or matches a data exchange pattern for the particular user profile, then the location associated with the current data exchange can be identified as the location of the data exchange as received without a further location request being sent to the user device at 314. In some instances, a planned or standard location request can be suppressed or otherwise stopped when the particular location associated with the current data exchange matches or otherwise corresponds to a location within the existing data exchange pattern.

In some instances, the data exchange patterns for the user profile may provide a standard path or set of transactions, along with different areas or distances from that path that provide different levels of confidence that the user would be at those locations. If a new data exchange is associated with a location off the standard path, a calculation may be performed to determine whether a threshold level of confidence is associated with the current location. For instance, a higher level of certainty may be associated with a data exchange having a location one or two blocks off the standard path. However, a lower level of certainty may be associated with a data exchange having a location five or more blocks off the standard path. The deviations may be based on a relative distance from the standard path of the pattern, or from a predetermined distance. In some instances, such as where a higher density of businesses and entities may be available, the distance within a higher threshold may be smaller. In instances with a low density of potential data exchange partners, a slightly larger distance may still fall within the higher threshold. The certainty thresholds, and the factors that apply to determine a certainty score or value, may be different in each case or implementation. For example, a much higher certainty threshold may be required for financial security applications, while a relatively lower certainty threshold is needed for marketing-related applications. Further, the calculation of such a location range and associated threshold need not be limited to any descriptions provided herein. Instead, the threshold can be calculated to provide a level of confidence that a user is within a certain area or location. Different user profiles and/or different inputs or recent actions may be provided different weights and considerations in determining a particular certainty threshold.

Returning to 304, if a determination is made that the current data exchange location does not match or correspond to a certainty level threshold or required by the system, the method 300 continues at 306 to provide a standard location ping to determine the current location of a user device associated with the user profile. At 306, the system can transmit, via a communications module, a second signal to one or more user devices associated with the current data exchange with a request for the current location of the user device. The user device may be used as a proxy for the user's location, particularly where the user device is a mobile phone or smartwatch likely to be on the user at most times. The user device may also be a laptop, tablet, or other device capable of receiving the location request, determining the location, and responding in an appropriate manner. In some instances, the transmitted request may include a request for a GPS- or aGPS-determined coordinate of the user device or for another derived location of the user device. In alternate instances, contextual information available to the user device may be acceptable to determine whether the location of the user device matches or corresponds to the location included in the current data exchange.

At 308, a third signal is received, via the communications module, from the user device responsive to the transmitted request, including the current location of the user device. At 310, this received current location can be used as the current location of the user profile and/or the received current location can be associated with the current data exchange.

Optionally, a fraud or further analysis can be performed at 312 based on the discrepancy or difference between the particular location identified with the first signal and the actual current location received from the user device at 308. The fraud analysis may focus on the location of the user device, the possibility of one or more other user devices being located at or near the location of the data exchange, or consider other possibilities, including an unauthorized person using a physical payment card or access attempt in the name of the user associated with the user profile.

In some instances, the data exchange comprises a financial transaction. The data exchange pattern may include a historical set of financial transactions and locations associated with those purchases. In such instances, the first signal may be associated with a transaction attempted using a physical payment method (e.g., a physical credit card). The data exchange pattern may be based on data exchanges, including prior financial transactions, performed using the user's user device and/or a physical payment card, or other payment means. In some instances, non-financial transactions can be used to populate the historical set of data exchange information and to thereby derive the one or more patterns associated with the user profile.

In some instances, the information related to the current data exchange received in the first signal may only include information identifying the particular entity associated with the data exchange. In those instances, the particular entity may be associated with a particular location which can be derived by the system or another component, such as by a look-up table, a cross-reference of the particular entity to a location database, or another automated operation for identifying the location.

In some instances, at least some of the data exchange patterns may be associated with a particular time range in which the patterns are valid and/or should be considered in the comparison of 304. For example, one pattern may be associated with a morning or afternoon commute. If the time of the current data exchange does not match one of those times, data exchanges that occur in the locations associated with those patterns may not be typical or expected. Therefore, the location of the user cannot be identified or associated with significant certainty using the pattern outside those associated times. The time of the current data exchange used in the comparison may be the time the first signal is received, or may be a timestamp or indication included in or associated with the received information about the current data exchange.

FIGS. 4-6 are example illustrations of location and data exchange patterns associated with a particular user profile. In FIG. 4, the path shown may be a determined pattern for a user as they travel to work each day. As illustrated, the user may live at (A), travel to a transit terminal at (B), and work at (C). The locations illustrated in FIG. 4 can be recorded based on prior data exchanges (e.g., transactions, ticket entry, etc.) performed by the user over time. Alternatively, or in addition, the locations that are recorded may be acquired based on pinging the user's mobile device for geo-location information and inferring the pattern from that information once a requisite amount of information is collected.

Once the pattern is determined, certainty or confidence boundaries can be drawn or associated with particular areas or locations near and around the pattern as shown in FIG. 5. Specifically, those certainty boundaries can be used to identify the likelihood that a user is within a certain area. As illustrated, two boundaries may be applied or associated with different areas in the pattern. The boundaries indicate that when the user is expected to be at (B), the outer boundary indicates that based on previous patterns there is a 95% chance that the user is within the outer boundary. Thus, if a transaction is processed outside this boundary, such as at location (D) which is outside that outer boundary, that determination may prompt the system to ping the user's device to insure the transaction is not a fraudulent one.

As illustrated in FIG. 6, the locational boundaries may be adjusted with time in order to follow the movement patterns of the user. For example, in FIG. 6, it is apparent that the boundaries change as the user travels to work through their normal or usual routine based on prior locations and data exchange tracking. FIG. 6 illustrates that during a normal workday, the user may have transactions that occur at each one of the points (A), (B), and (C). For example, the user may board a bus at (A), transfer at (B), and purchase coffee at (C). Further, during lunch hours, the potential boundaries expand to the 12-1 PM boundary as illustrated and as centered on the place of work.

When data exchanges are received in one of the boundaries matching the identified patterns, the system can determine that the location may be implied based on the expected activities of the user. The data exchanges themselves, as they are located within the expected area, can be used to identify the user's location. In such instances, no further confirmation may be needed or requested from the user device, thereby avoiding or suppressing a pinging to the mobile device and avoiding a potential battery drain caused by the location-based service or determination.

The preceding figures and accompanying description illustrate example processes and computer-implementable techniques. But system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, the described systems and flows may use processes and/or components with or performing additional operations, fewer operations, and/or different operations, so long as the methods and systems remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A system comprising:
   a communications module;
   at least one memory storing instructions, a plurality of user profiles, each user profile associated with a user device, and a repository of data exchange patterns associated with particular user profiles of the plurality of user profiles, each data exchange pattern identifying a locational and a data exchange history of the particular user profile; and
   at least one hardware processor interoperably coupled with the at least one memory and the communications module, wherein the instructions instruct the at least one hardware processor to:
      receive a first signal, via the communications module, associated with information related to a current data exchange associated with a particular user profile, the current data exchange associated with a particular location;
      compare the current data exchange associated with the particular user profile with the data exchange pattern associated with the particular user profile to determine whether the current data exchange corresponds to the data exchange pattern associated with the particular user profile;
      in response to determining that the current data exchange does not correspond to the data exchange pattern associated with the particular user profile:
         transmit, via the communications module and to the user device associated with the particular user profile, a second signal including a request for information on a current location of the user device;
         receive, via the communications module, a third signal from the user device in response to the second signal, the third signal including the current location of the user device; and
         associate the current data exchange with the current location of the user device from the third signal;
      in response to determining that the current data exchange corresponds to the data exchange pattern associated with the particular user profile, associate the current data exchange with the particular location associated with the first signal.

2. The system of claim 1, wherein the data exchange comprises a financial transaction, and wherein the data exchange pattern identifies a history of financial transactions and locations associated with each of the financial transactions.

3. The system of claim 1, wherein associating the current data exchange with the particular location associated with the first signal in response to determining that the current data exchange corresponds to the transactional pattern associated with the particular user profile further comprises suppressing transmission of the second signal by the communications module.

4. The system of claim 1, wherein the information related to the current data exchange identifies a particular entity associated with the current data exchange, where the particular entity is associated with a physical location.

5. The system of claim 1, wherein the pattern for the particular user profile identifies a data exchange and location pattern determined based on a collected history of prior data exchanges associated with the user profile.

6. The system of claim 5, wherein at least a portion of the prior data exchanges in the collected history for particular user profiles are associated with a location obtained by a location provided by the user device at a time the prior data exchange occurred.

7. The system of claim 5, wherein at least a portion of the prior data exchanges in the collected history for particular user profiles are associated with a location obtained from information associated with the data exchange provided by an entity with which the data exchange was executed.

8. The system of claim 5, wherein at least some of the data exchange and location patterns are associated with time ranges, the time ranges identifying when particular portions of the patterns are valid.

9. The system of claim 8, wherein the current data exchange is associated with a current time, and wherein comparing the current data exchange associated with the particular user profile with the pattern of the particular user profile to determine whether the current data exchange corresponds to the pattern includes applying the pattern associated with a time range including the current time for the comparison.

10. The system of claim 1, wherein comparing the current data exchange associated with the particular user profile with the pattern of the particular user profile to determine whether the current data exchange corresponds to the data exchange pattern comprises generating a confidence score based on the comparison, wherein the current data exchange is determined to correspond to the data exchange pattern based on the generated confidence score meeting or exceeding a threshold confidence score.

11. The system of claim 1, further comprising, in response to determining that the current data exchange does not correspond to the data exchange pattern associated with the particular user profile, and after associating the current data exchange with the current location of the user device, performing a fraud analysis to confirm validity of the current data exchange.

12. The system of claim 1, wherein the current data exchange is performed via a mobile device.

13. The system of claim 1, wherein the current data exchange is performed via a physical card at the location of the data exchange.

14. The system of claim 1, wherein receiving the third signal from the user device in response to the second signal includes receiving global positional system (GPS) data or assisted GPS (A-GPS) data from the user device corresponding to the time of the request for information on the current location of the user device.

15. The system of claim 1, wherein the location and data exchange histories of the plurality of user profiles are stored in separate databases, and wherein the locations in a location database and the data exchanges in a data exchange database are linked by a key used to correlate location information and data exchange information.

16. A non-transitory, computer-readable medium storing computer-readable instructions executable by a computer and configured to:
receive a first signal, via a communications module, associated with information related to a current data exchange associated with a particular user profile of a plurality of user profiles, the current data exchange associated with a particular location, each user profile in the plurality of user profiles associated with at least one data exchange pattern, each data exchange pattern identifying a locational and a data exchange history of the particular user profile;
compare the current data exchange associated with the particular user profile with a data exchange pattern associated with the particular user profile to determine whether the current data exchange corresponds to the data exchange pattern associated with the particular user profile;
in response to determining that the current data exchange does not correspond to the data exchange pattern associated with the particular user profile:
transmit, via the communications module and to the user device associated with the particular user profile, a second signal including a request for information on a current location of the user device;
receive, via the communications module, a third signal from the user device in response to the second signal, the third signal including the current location of the user device; and
associate the current data exchange with the current location of the user device from the third signal;
in response to determining that the current data exchange corresponds to the data exchange pattern associated with the particular user profile, associate the current data exchange with the particular location associated with the first signal.

17. The computer-readable medium of claim 16, wherein the data exchange comprises a financial transaction, and wherein the data exchange pattern identifies a history of financial transactions and locations associated with each of the financial transactions.

18. The computer-readable medium of claim 16, wherein associating the current data exchange with the particular location associated with the first signal in response to determining that the current data exchange corresponds to the transactional pattern associated with the particular user profile further comprises suppressing transmission of the second signal by the communications module.

19. The computer-readable medium of claim 16, wherein the information related to the current data exchange identifies a particular entity associated with the current data exchange, where the particular entity is associated with a physical location.

20. A computerized method performed by one or more processors, the method comprising:
receiving a first signal, via a communications module, associated with information related to a current data exchange associated with a particular user profile of a plurality of user profiles, the current data exchange associated with a particular location, each user profile in the plurality of user profiles associated with at least one data exchange pattern, each data exchange pattern identifying a locational and a data exchange history of the particular user profile;
comparing the current data exchange associated with the particular user profile with a data exchange pattern associated with the particular user profile to determine whether the current data exchange corresponds to the data exchange pattern associated with the particular user profile;

in response to determining that the current data exchange does not correspond to the data exchange pattern associated with the particular user profile:
  transmitting, via the communications module and to the user device associated with the particular user profile, a second signal including a request for information on a current location of the user device;
  receiving, via the communications module, a third signal from the user device in response to the second signal, the third signal including the current location of the user device; and
  associating the current data exchange with the current location of the user device from the third signal;
in response to determining that the current data exchange corresponds to the data exchange pattern associated with the particular user profile, associating the current data exchange with the particular location associated with the first signal.

* * * * *